March 28, 1950   A. GLASSNER   2,501,673
POWDERED ZINC ANODE FOR PRIMARY CELLS
Filed Dec. 4, 1945

INVENTOR.
ALVIN GLASSNER
BY William D. Hall
Attorney.

Patented Mar. 28, 1950

2,501,673

UNITED STATES PATENT OFFICE 2,501,673

POWDERED ZINC ANODE FOR PRIMARY CELLS

Alvin Glassner, Eatontown, N. J., assignor to the United States of America as represented by the Secretary of War Application December 4, 1945, Serial No. 632,781

2 Claims. (Cl. 136—130)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to anodes for primary electric cells of the alkaline dry type, and more particularly to primary cells having an anode of zinc, an alkaline electrolyte and a depolarizing electrode formed of an oxidizing agent.

An object of the invention is to provide an improved anode for a primary dry cell, so that the cell may have increased capacity.

Other objects and advantages will be appreciated by those skilled in the art.

It has been customary, in making cells operating under the same general system as the cell for which this invention was originated, to construct the anode as a roll or spiral of adjacent strips of corrugated zinc foil and paper, the latter being subsequently saturated with a liquid electrolyte. The roll or spiral form of anode has been used due to the comparatively large surface area afforded thereby, the current density being thereby diminished, with the consequent advantage of greater capacity of the cell under high current drain.

In the improved cell of my invention, I provide an anode having a surface area many times that afforded by the spiral form, thereby further diminishing the current density of the anode, and further greatly improving the capacity of the cell under high current drain. My invention also enables me to dispense with the operation of corrugating the zinc, thereby simplifying the process of making the anode of the cell.

The anode of my present invention may be in the form of a porous strip or sheet of anodic metal, such as zinc for example, the porosity of the strip or sheet being such that it is electrolyte-absorbent. Such an anode may be made by compressing powdered anodic metal so that the particles cohere to form a body. The anode may also include, if desired, particles of electrically non-conducting material which is inherently porous, such as asbestos or diatomaceous earth or other known porous mineral matter. The particles of such non-conducting and electrolyte-absorbent material function as reservoirs of electrolyte, which is fed to the surfaces of the anodic particles in the event that part of the electrolyte leaks out of the porous anodic metal. The anode of the invention, whether with or without the non-conducting porous particles, may be formed on a web or gauze as a base.

The type of anode disclosed provides a much larger interstitial area in contact with the electrolyte than is afforded by prior types of anodes, whereby the cell employing the improved anode has an increased capacity for any given size of cell.

The anode described, according to this invention, is arranged in layers which alternate with layers of an electrically non-conducting, electrolyte-absorbent material, as paper for example, and such alternating layers are hereinafter illustrated as being in the form of a roll, but need not necessarily be so, as they may be arranged in parallel layers.

The drawings show the construction of a dry cell embodying the invention.

Figure 1:
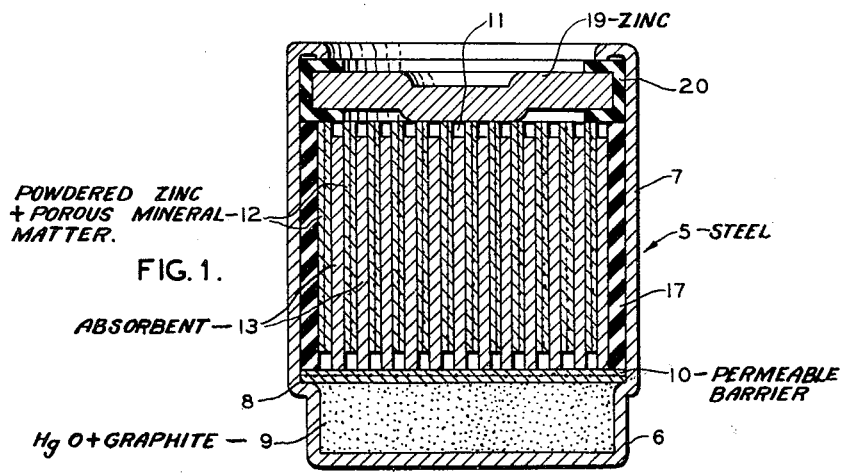
Figure 1 is a central vertical section of the cell.
Figure 2:
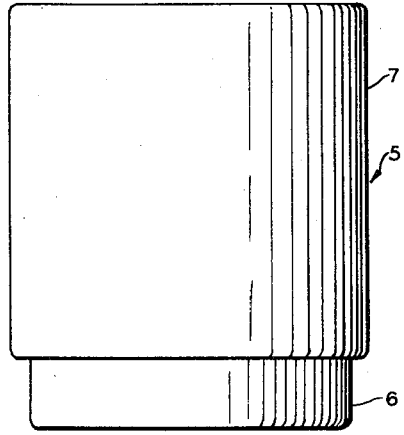
Figure 2 shows the cell in elevation.

Referring to the drawings for a more detailed description thereof, the numeral 5 indicates an integral steel container having a base part 6, and an upper part 7 which is of larger diameter than the base part, a ledge 8 being thereby formed.

A depolarizing cathode 9 is pressed into the base part 6 and fills the same, the upper surface of the cathode being substantially flush with the ledge 8. The cathode for the type of cell illustrated is of a known type, and is a body made by compressing a mixture of mercuric oxide and graphite, both in comminuted form.

Lying on, and pressing against, the cathode 9, is a permeable barrier 10, about .003 inch thick, which is disposed in the upper and enlarged part of the container, and extends to the inner surface of the same. The outer, marginal portion of the barrier, lies on, and presses against, the ledge 8, thereby functioning as a seal between the cathode and the anode of the cell to prevent the passage of material from one electrode to the other. It will be understood, however, that the barrier, being permeable to the electrolyte, allows the passage of current between the electrodes.

A porous, electrolyte-absorbent anode body 11 is disposed in the upper part of the container 5, and is of substantially the same diameter as the cathode 9, and rests on the barrier 10. This anode body is shown as comprising a roll or spiral, formed by winding, or rolling together, contacting strips or sheets 12 and 13, in lapped or offset relation, the latter extending below the former and contacting the barrier 10. The strip 13 is of electrically non-conducting material, such as paper, and is adapted to absorb electrolyte, as known in the art. This strip may be omitted and the anode roll formed from the porous zinc sheet alone.

Figure 3:
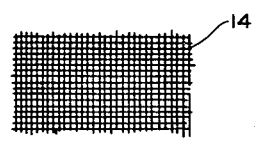
Figure 3 is a plan view of a web or gauze employed in the construction of the cell.
Figure 4:
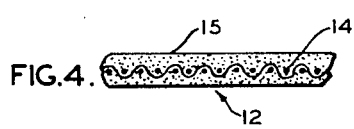
Figure 4 is an enlarged side view of the web or gauze to which compressed and cohering particles are adherent on both faces.

The strip 12 is shown in Figure 4 as comprising an open web, or gauze 14, of which Figure 3 is a plan view. Said web may be of mercerized cotton, being mercerized to avoid shrinkage. The web is saturated with water and it is then coated, preferably on both faces, with a mixture 15 consisting of zinc particles and particles of electrically non-conducting, electrolyte-absorbent material such as asbestos, diatomaceous earth or other known porous mineral matter. The particles of zinc may have an average size of 100–200 mesh, while the non-conducting particles, which preferably constitute from 5% to 15% of the mixture, may have an average size of 250 mesh. The mentioned mixture, applied to the web 14, may be passed between a series of pairs of hot rolls, which work successively at higher pressures, the final pair of rolls exerting a pressure of 5000 to 8000 pounds per square inch, whereby an integrated strip or sheet is formed.

The mentioned web 14 is desirable as giving strength to the strip or sheet, but is not essential, as a sheet may be formed without it, merely by compressing the mixture described above. Likewise, the mentioned non-conducting, electrolyte-absorbent matter is desirably incorporated for the reason previously stated, but may be omitted, and the sheet formed by compressing the zinc particles alone.

Surrounding the anode, and filling the space between it and the inner wall of the upper part of the container, is an insulating component 17, which rests on, and presses against, the marginal portion of the barrier. The insulator 17 therefore not only serves to insulate the anode from the inner wall of the upper part of the container, but, by filling the space mentioned, and also by pressing on the marginal portion of the barrier, functions to assist in making the barrier an effective seal to prevent the movement of material from each electrode to the other.

A metallic top or closure 19, preferably of zinc, is provided for the cell. This top has a centrally depressed area which contacts the upper surface of the anode body 11, while the relatively elevated peripheral margin fits into the channeled insulating grommet 20. The grommet is pressed onto both sides of the marginal portion of the top 19, to form a tight seal in combination with the upper edge of the container, which is turned inwardly and downwardly to exert pressure on the grommet 20 and the top 19, so that the anode body 11 and the insulator 17, by transmitted pressure, bear down on the barrier 10, whereby the latter forms an effective seal for the purpose previously mentioned.

The nature of the electrolyte for this type of cell is known, being an aqueous solution of an alkali hydroxide, substantially saturated with zinc oxide when the anode is zinc. For convenience, it is stated here that the electrolyte may be made by dissolving 75 grams of potassium hydroxide in 100 grams of water, to which solution 12 grams of zinc oxide are added and dissolved therein. As stated above, the elements of the anode body are electrolyte-absorbent and this body is therefore immersed in the electrolyte until saturated with the same.

What is claimed is:

1. An improved zinc anode for primary cells having an alkaline electrolyte and a depolarizing electrode formed of an oxidizing agent, said zinc anode comprising an electrolyte-absorbing sheet of a mixture of cohering particles of powdered zinc and particles of porous, electrically non-conducting mineral material, said sheet formed into a spirally wound body.

2. An improved zinc anode according to claim 1 characterized in that said porous, electrically non-conducting particles comprise a mineral material selected from the group consisting of asbestos and diatomaceous earth.

ALVIN GLASSNER.

REFERENCES CITED

The following references are of record in the file of this patent:

UNITED STATES PATENTS

| Number | Name | Date |
|---|---|---|
| 413,438 | Eggers | Oct. 22, 1889 |
| 546,739 | Johnson et al. | Sept. 24, 1895 |
| 2,307,627 | Lawson | Jan. 5, 1943 |
| 2,422,045 | Ruben | June 10, 1947 |
| 2,463,316 | Ruben | Mar. 1, 1949 |

FOREIGN PATENTS

| Number | Country | Date |
|---|---|---|
| 271,496 | Great Britain | Sept. 29, 1927 |
| 862,859 | France | Dec. 3, 1940 |